(12) United States Patent
Horesh

(10) Patent No.: US 11,940,968 B2
(45) Date of Patent: Mar. 26, 2024

(54) SYSTEMS AND METHODS FOR STRUCTURING DATA

(71) Applicant: INTUIT INC., Mountain View, CA (US)

(72) Inventor: Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 160 days.

(21) Appl. No.: 17/560,030

(22) Filed: Dec. 22, 2021

(65) Prior Publication Data

US 2023/0195706 A1 Jun. 22, 2023

(51) Int. Cl.
*G06F 16/22* (2019.01)
*G06N 20/00* (2019.01)

(52) U.S. Cl.
CPC ......... *G06F 16/2246* (2019.01); *G06N 20/00* (2019.01)

(58) Field of Classification Search
CPC ... G06F 16/2246; G06F 16/245; G06N 20/00; G06N 5/01
USPC .......... 707/711, 741, 748, 797, 798
See application file for complete search history.

(56) References Cited

U.S. PATENT DOCUMENTS

| | | | | |
|---|---|---|---|---|
| 8,032,822 B1 * | 10/2011 | Artamonov | ......... | G06Q 40/123 715/255 |
| 2006/0280335 A1 * | 12/2006 | Tomita, Jr. | ............. | G06T 7/251 382/103 |
| 2008/0154873 A1 * | 6/2008 | Redlich | ................. | G06F 16/951 707/999.005 |
| 2019/0340279 A1 * | 11/2019 | Michels | ............... | G06F 16/2453 |
| 2021/0019339 A1 * | 1/2021 | Ghulati | ................. | G06N 20/00 |
| 2023/0162517 A1 * | 5/2023 | Le | ........................ | G06V 30/412 382/190 |

* cited by examiner

*Primary Examiner* — Phong H Nguyen
(74) *Attorney, Agent, or Firm* — DLA PIPER LLP (US)

(57) ABSTRACT

Systems and methods are provided to structure event description data.

16 Claims, 8 Drawing Sheets

SYSTEMS AND METHODS FOR STRUCTURING DATA

BACKGROUND OF THE DISCLOSURE

Organizations and systems that handle transactional data streams often process large numbers (sometimes millions) of transactions on a daily basis. Transactional data can include financial transactional data, consumer transactional data, small/large business data, to name a few, and is typically complex and mostly unstructured. Some fields may be structured, such as, the amount and date portions of e.g., financial transactional data. However, there is also a description field in this type of data, which is more complex and unstructured. The description contains free-form text, free-text strings, and the like. In addition, field contains information about the two sides of a transaction such as merchant identities, address, an indication of the type of transaction (e.g., credit card, cash, ACH, etc.), if there were non-sufficient funds (NSF), and many other pertinent details. Example transaction descriptions can be: "RECURRING PAYMENT AUTHORIZED ON 10/11 MICROSOFT*ADVERTIS 800-628-5489 NV S389915802137231 CARD 1528" or "QuickPay with Zelle payment to John Smith JPM233740218." In addition to being unstructured, description fields can have inconsistent formats across systems. For example, different systems inconsistently use abbreviations for certain entities, mask certain numbers, include names, etc. There is not a standardized way of formatting such data, which is undesirable.

Structuring the above-mentioned transactional data may facilitate various types of downstream analyses of the data. For example, accounting services and personal finance tools process transactions on behalf of a business or user to provide insights, allow for financial management, budgeting, visualizations, and many other functions. Doing so with unstructured data is a strenuous and inefficient task. Current methods for structuring transactional data (e.g., the description field of transactions) attempt to independently detect various "entities" within a transaction description. Entities can include, but are not limited to, a company/entity involved in the transaction, a company branch or branch-like identifier (e.g., a textual identifier that determines which store in a chain was visited), date and time, location (e.g., zip code, city, state, street address), method of payment (e.g., credit card, PayPal, debit card, Venmo, ACH, etc.), online/physical transaction, an NSF event, a salary, a person's name, running numbers, card identification, money withdrawal, parking, etc. In other words, current methods analyze a transaction description multiple times to identify various entities associated with the transaction independently. This is both inefficient and inaccurate, which is also undesirable.

DESCRIPTION

The following detailed description is merely exemplary in nature and is not intended to limit the claimed invention or the applications of its use.

Embodiments of the present disclosure relate to systems and methods for structuring data, such as transactional description data, in a more accurate and efficient manner than what has been done in the past. The disclosed methods can analyze a transaction as a whole, detecting the various entities together to accomplish the structuring, rather than detecting each entity independently. This can ensure coherence and boost the accuracy of the overall detection and structuring.

The disclosed methods may use multiple entity-specific extractors, which return predictions with confidence levels of various entities within the description. Once the predictions are collected, a conflict resolution component determines the final structure of the description with a cost function that favors high textual coverage with no overlaps between the entities and with a high overall confidence. The conflict resolution component can utilize a search tree to resolve conflicts, such as e.g., overlapping/duplicated assignments of characters. In addition, one or more embodiments may factor in user-defined, expert rules to increase the flexibility of the structuring. The disclosed system and methods can therefore minimize overlaps and gaps (i.e., potentially missed data) during the structuring of a transaction. This combines the power and accuracy of a plurality of specific extractors to ultimately determine a more accurate structure. And by structuring this data, a more comprehensive understanding of the transaction can be derived, improving services around transaction categorization, risk evaluation, PII masking, and more.

The principles disclosed herein as described as being used for tax and or financial services by way of example and not limitation. It should be appreciated that the disclosed principles can be applied to other electronic services requiring user-entered data/information. In particular, the disclosed principles can be utilized more generally to various systems and applications that involves textual descriptions for events, such as events related to the monitoring of hardware and/or software systems, video game and sports event monitoring, threat tracking and monitoring, and the like.

Figure 1:
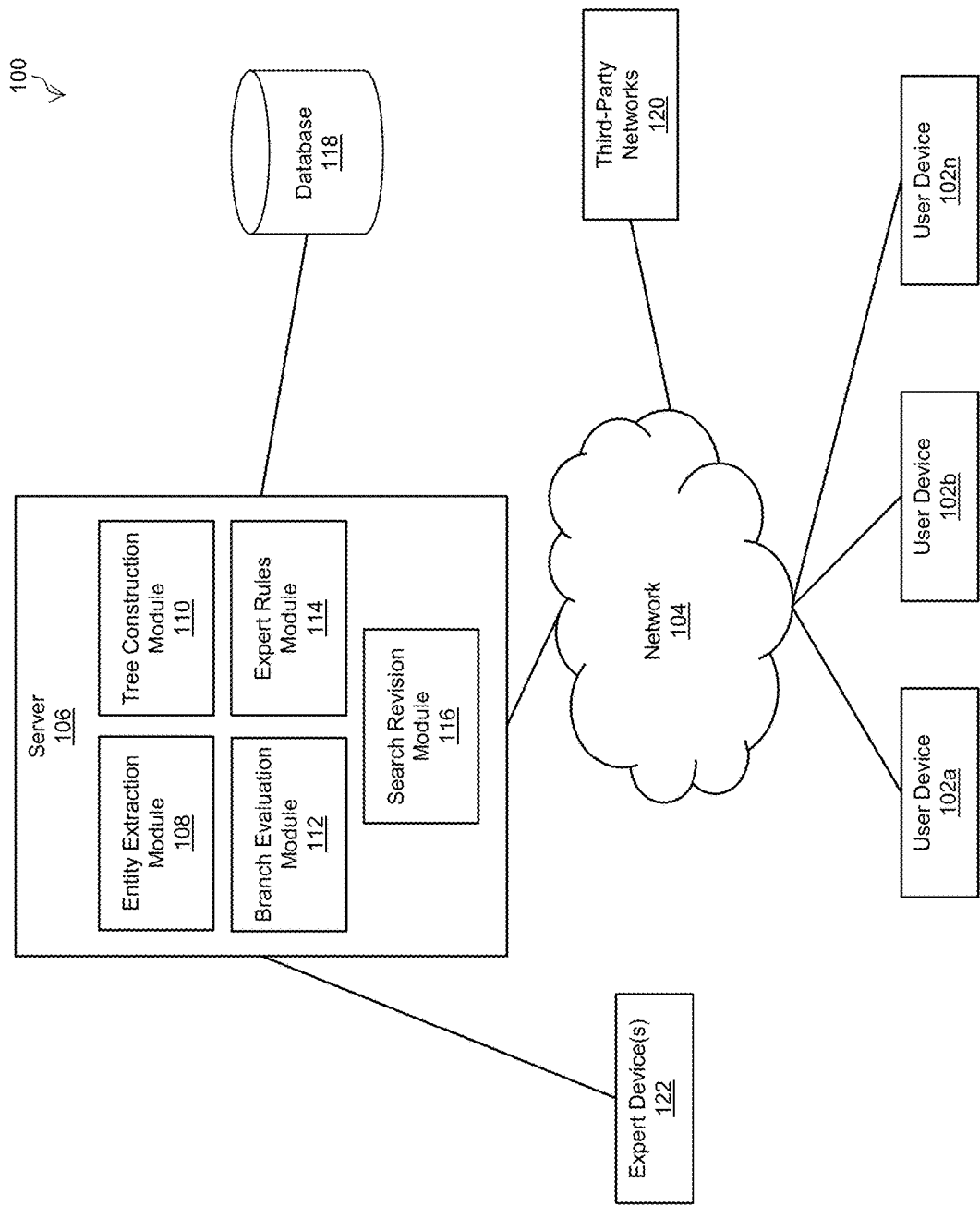
FIG. 1 is a block diagram of an example system for structuring data according to some embodiments of the present disclosure.

FIG. 1 is a block diagram of an example system 100 for structuring data according to some embodiments of the present disclosure. The system 100 can include a plurality of user devices 102*a-n* (generally referred to herein as a "user device 102" or collectively referred to herein as "user devices 102") and a server 106, which are communicably coupled via a network 104. In some embodiments, the system 100 can include any number of user devices 102. For example, for an organization that manages accounting software or personal finance software and associated databases, there may be an extensive userbase with thousands or even millions of users that connect to the system 100 via their user devices 102. Components of the system 100 can also communicate with one or more third-party networks 120 (e.g., financial networks) via the network 104. The server 106 can be configured to receive financial transaction information from the third-party networks 120 associated with the various users of user devices 102. For example, if the system is to be used for tax and or financial services, a user can, via its user device 102, connect his/her financial instruments (e.g., checking accounts, savings accounts, credit cards, investment accounts, etc.) to a planning tool (e.g., Credit Karma™, Mint™, QuickBooks®, etc.) so that transactional information or a transactional stream is compiled on behalf of the user. Once the connection is defined, the server 106 can be authorized to obtain such information associated with the connected financial instruments from the third-party networks 120. In addition, the system 100 includes one or more expert devices 122 (generally referred to herein as a "expert device 122" or collectively referred to herein as "expert devices 122"). An expert device 122 can be used by an expert or other user to define various expert rules, such as expert-defined extraction rules and expert-defined evaluation rules (see FIG. 3).

A user device 102 and or expert device 122 can include one or more computing devices capable of receiving user input, transmitting and/or receiving data via the network 104, and or communicating with the server 106. In some embodiments, a user device 102 and or expert device 122 can be a conventional computer system, such as a desktop or laptop computer. Alternatively, a user device 102 and or expert device 122 can be a device having computer functionality, such as a personal digital assistant (PDA), a mobile telephone, a smartphone, or other suitable device. In some embodiments, a user device 102 and or expert device 122 can be the same as or similar to the computing device 800 described below with respect to FIG. 8. In some embodiments, the system 100 can include any number of user devices 102 and or expert devices 122.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 700 described below in the context of FIG. 7.

As shown in FIG. 1, the server 106 includes an entity extraction module 108, a tree construction module 110, a branch evaluation module 112, an expert rules module 114, and a search revision module 116. The server 106 can access the one or more third-party networks 120 to obtain transactional data that is to be structured and prepared for use in other applications (e.g., PII masking, categorization, etc.). The server 106 can also be connected to a database 118, which can store expert rules (obtained from expert rules module 114) and structured transactional data.

The entity extraction module 108 comprises a plurality of entity-specific extractors, each of which is configured to identify and extract a specific entity from a transaction description. As discussed above, entities can include, but are not limited to, a company/entity involved in the transaction, a company branch or branch-like identifier (e.g., a textual identifier that determines which store in a chain was visited), date and time, location (e.g., zip code, city, state, street address), method of payment (e.g., credit card, PayPal, debit card, Venmo, ACH, etc.), online/physical transaction, an NSF event, a salary, a person's name, running numbers, card identification, money withdrawal, parking, etc. In some embodiments, an extractor can include one or more pre-defined "RegEx-es" (Regular Expressions: a sequence of alphanumeric characters) and can be configured to search a description (or other textual string) for the pre-defined sequence of characters. For example, an "email" extractor can use a RegEx that includes an @ symbol, a sequence of text (e.g., Yahoo, Gmail, etc.), and ".com". Another example is a "date" extractor that can detect a "XX/XX/XXXX" format within a textual string. Other RegEx extractors can include, but are not limited to, two-letter abbreviations of states, major merchants, common names (both first names and surnames), etc.

In some embodiments, the entity extraction module 108 also includes one or more machine learning classifiers that are trained to detect various entities. Such machine learning classifiers can utilize a long short-term memory (LSTM) neural network or other similar classifier variation (e.g., transformers) that are trained to identify textual patterns. In some embodiments, the classifier can also use user features to detect an entity, such as the user's (i.e., the user associated with the actual transaction) asserted state of domicile, monthly spending volume, etc. Each extractor (whether machine learning-based or RegEx-based) returns suggested instances (i.e., string of characters that is predicted to be an entity) with an associated confidence level assigned to each instance, which is typically a P-value between 0 and 1. Therefore, via the plurality of extractors, the entity extraction module 108 analyzes a transaction description and outputs various possible instances for various entities, along with the associated confidence values. For example, considering the string "12 Jefferson SF POS," the entity extraction module 108 can predict that "Jefferson" is a company name, that "Jefferson SF" is an address, that "12 Jefferson SF POS" is also an address, and that "POS" is an indication that the transaction was done at a physical store. These suggestions are evaluated to determine the most probable way to structure the string. In some embodiments, each suggestion or prediction returned by the entity extraction module 108 can be a tuple of four: {starting position, length, domain, confidence level}. For example, {16, 2, state, 0.9} represents that WA represents a state within the string "0123456789012345WA".

The tree construction module 110 is configured to build a search tree based on the extracted entity candidates outputted from the entity extraction module 108. The search tree can enumerate the possible combinations of the outputs from the various extractors in the entity extraction module 108. In some embodiments, the tree construction module 110 can utilize either a DFS approach, a BFS approach, or other similar approach. In some embodiments, the tree construction module 110 can build the tree in a recursive manner, where the first level nodes of the tree are the left-most potential entities from the description. Then, below each first level node, the possible entities continue rightward along the description. Such a "top-down" trajectory within each branch of the tree therefore represents a valid way of tiling or structuring the text. Therefore, a branch is an annotation that labels/structures/annotates the various entities in the transaction description.

The branch evaluation module 112 is configured to evaluate each branch of the tree created by the tree construction module 110. In some embodiments, the branch evaluation module 112 computes a score for each branch and identifies the branch with the highest score as the most probable way to structure the transaction description. Additional details on how branch scores are computed are discussed in relation to FIG. 4.

The expert rules module 114 allows experts, via expert devices 122, to define custom rules to be applied during the disclosed structuring processes. The rules can be utilized at various stages, including both the entity extraction phase and the branch evaluation phase. For example, an expert can define a rule that a state name comes at the end of a description in 90% of instances, that a city name is likely come immediately before a state name and be adjacent a street name, and that an NSF event cannot add money to an account, although these are not limiting examples. Additional examples of expert rules are defined in relation to FIG. 3.

The search revision module 116 is configured to halt a search, evaluation, or construction of the search tree if it takes too long (e.g., longer than a predefined time period). The search revision module 116 can also be configured to restart the search, but with fewer suggestions, by demanding higher confidence levels from the extractors. In other words, the search revision module 116 can remove branches with entity instances that have confidence levels below a certain threshold.

Figure 2:
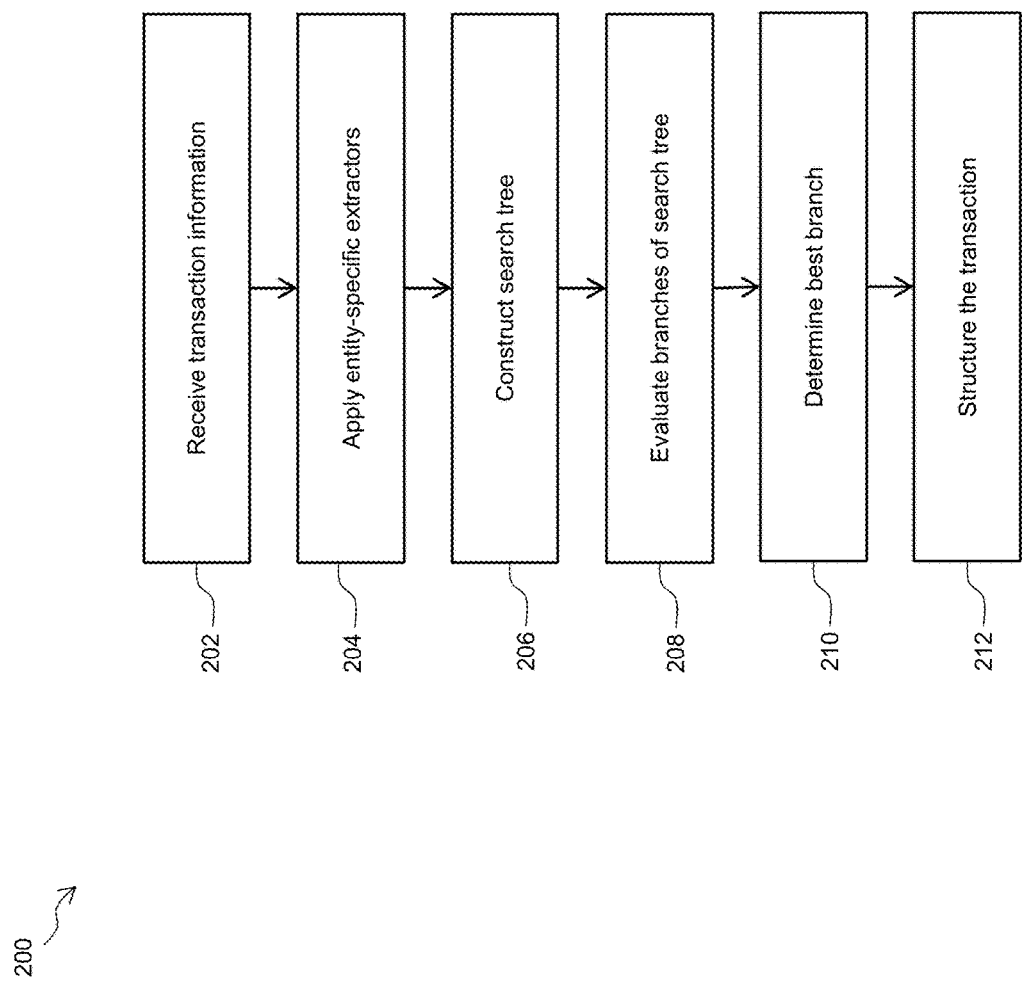
FIG. 2 is a flow diagram showing an example process for structuring data according to some embodiments of the present disclosure.

FIG. 2 is a flow diagram showing an example process 200 for structuring data according to some embodiments of the present disclosure. In some embodiments, process 200 is performed within the system 100 of FIG. 1, such as by the server 106 and its various modules. At block 202, the server 106 receives a transaction (i.e., transaction description, amount, date/time, etc.) from a third-party network 120. In some embodiments, the receiving of the transaction description can be from a transaction stream for a particular user. An example transaction description can be "CHECKCARD 0999 ROSAS CAFÉ & TORTILLA F LUBBOCK TX 240999999999".

At block 204, the entity extraction module 108 applies entity-specific extractors to the transaction description. For the example description above, a payment method extractor, a merchant extractor, state extractor, serial number extractor, last four digits extractor, street extractor, and a city extractor can be applied. Each extractor identifies candidate strings for their respective entity, examples shown below in Table 1. Extractors can have one candidate (i.e., state, payment method, city) or multiple candidates that could serve as the entity (merchant, street). The output for each candidate is a 4-tuple that specifies the starting position, length, domain, and confidence level.

TABLE 1

| Entity | Candidates |
|---|---|
| Payment method | CHECKCARD |
| Merchant | CHECKCARD; ROSAS CAFÉ & TORTILLA F LUBBOCK TX; ROSAS CAFÉ & TORTILLA F LUBBOCK; ROSAS CAFÉ & TORTILLA; ROSAS CAFÉ & TORTILLA F; ROSAS CAFÉ |
| State | TX |
| Serial number | 240999999999 |
| Last four digits | CHECKCARD 0999 |
| Street | F, LUBBOCK |
| City | LUBBOCK |

It should be noted that these entities are not limiting and are merely exemplary in nature. Other entities can include, but are not limited to, a company/entity involved in the transaction, a company branch or branch-like identifier (e.g., a textual identifier that determines which store in a chain was visited), date and time, location (e.g., zip code, city, state, street address), method of payment (e.g., credit card, PayPal, debit card, Venmo, ACH, etc.), online/physical transaction, an NSF event, a salary, a person's name, running numbers, card identification, money withdrawal, parking, etc.

At block 206, the tree construction module 110 generates a recursive tree, such as a DFS or BFS tree, with the entity candidates extracted at block 204. The tree enumerates the possible combinations of the candidates from the various extractors in the transaction description, where each branch is a combination. For example, one branch can have payment method=CHECKCARD; merchant=ROSAS CAFÉ & TORTILLA; state=TX, serial number=240999999999; last four digits=CHECKCARD 0999; street=F; and city=LUBBOCK. Another branch can have payment method=CHECKCARD; merchant=ROSAS CAFÉ & TORTILLA F LUBBOCK; state=TX, serial number=240999999999; last four digits=CHECKCARD 0999; street=LUBBOCK; and city=LUBBOCK.

At block 208, the branch evaluation module 112 evaluates each branch of the tree created at block 206. For each branch, the branch evaluation module 112 computes a scores for each branch. The branch score can be based on the confidence levels of each entity in the branch and an assigned character ratio. Additional details on computing branch scores are discussed in relation to FIG. 4. At block 210, the branch evaluation module 112 determines the "best" or most probable branch from the tree (i.e., the branch with the highest score). At block 212, the server 106 then structures the transaction description based on the selected branch. The structured transaction description can then be stored in database 118.

Figure 3:
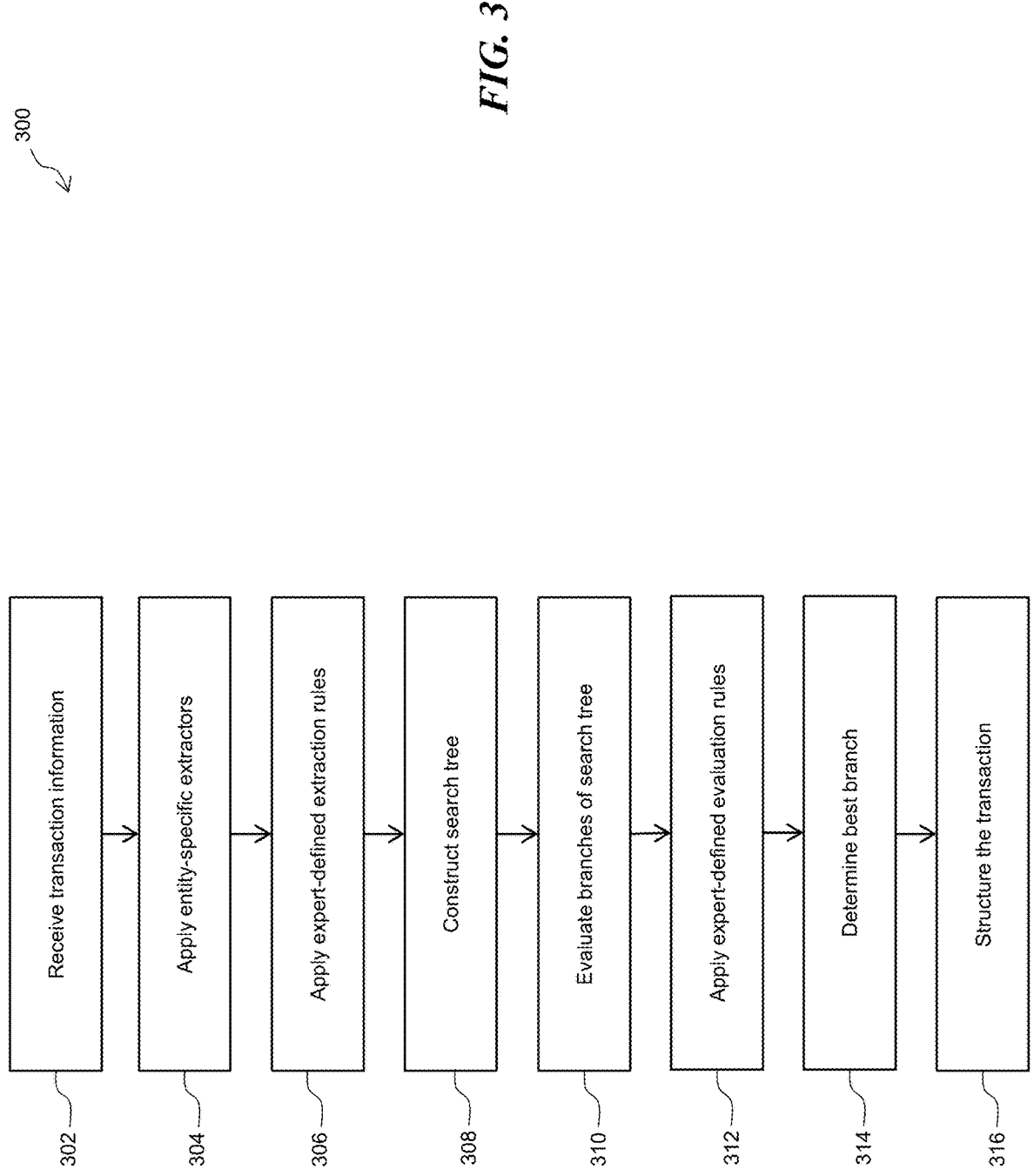
FIG. 3 is a flow diagram showing another example process for structuring data according to some embodiments of the present disclosure.

FIG. 3 is a flow diagram showing another example process 300 for structuring data according to some embodiments of the present disclosure. In some embodiments, process 300 is performed within the system 100 of FIG. 1, such as by the server 106 and its various modules. Process 300 can be similar to process 200 with the addition of various steps that apply expert-defined rules (herein referred to as expert-defined rules or custom-defined rules). At block 302, the server 106 receives a transaction (i.e., transaction description, amount, date/time, etc.) from a third-party network 120. In some embodiments, the receiving of the transaction description can be from a transaction stream for a user.

At block 304, the entity extraction module 108 applies entity-specific extractors to the transaction description to extract various entity candidates from the description.

At block 306, the expert rules module 114 applies expert-defined extraction rules to the transaction description. In some embodiments, expert-defined extraction rules can include rules that directly identify and extract an entity. In some embodiments, expert-defined extraction rules can also include rules that indirectly identify and extract an entity, such as by assisting and/or confirming a direct RegEx extractor. The rules can be defined by experts via an expert device 122 and can offer flexibility in terms of defining certain entities. Confidence levels, specific entities, and dollar amount thresholds can be manually defined. For example, expert-defined extraction rules can stipulate that a state name comes at the end of a description in 90% of instances, that a city name is likely come immediately before a state name and be adjacent to a street name, and that an NSF event cannot add money to an account. Another expert-defined extraction rule can stipulate that a car parking event will have a transaction amount between $1 and $100 with a 95% confidence level.

At block 308, the tree construction module 110 generates a recursive tree, such as a DFS or BFS tree, with the entity candidates extracted at blocks 304 and 306. The tree enumerates the possible combinations of the candidates from the various extractors in the transaction description, where each branch is a combination. At block 310, the branch evaluation module 112 evaluates each branch of the tree created at block 308. For each branch, the branch evaluation module 112 determines various parameters, such as parameters based on the confidence levels of each entity in the branch and an assigned character ratio. Additional details on computing branch scores are discussed in relation to FIG. 4. In addition, at block 312, the expert rules module 114 applies expert-defined evaluation rules to the branches of the tree constructed at block 308 to further evaluate the branches of the search tree. Expert-defined evaluation rules can be used to evaluate whether or not a branch (i.e., a structuring of the transaction description) is accurate and "makes sense." Examples of expert-defined evaluation rules can include, but are not limited to, if a state name exists (i.e., if a state entity was extracted at either blocks 304 or 306), it occurs at the end of the description with a confidence level of 0.90; that a state name will occur only once in a transaction description with a confidence level of 0.95, and that at least three different entities are expected to be extract4ed from a transaction description with a confidence level of 0.95.

At block 314, the branch evaluation module 112 determines the "best" or most probable branch from the tree (i.e., the branch with the highest score). At block 316, the server 106 then structures the transaction description based on the selected branch. The structured transaction description can then be stored in database 118.

Figure 4:
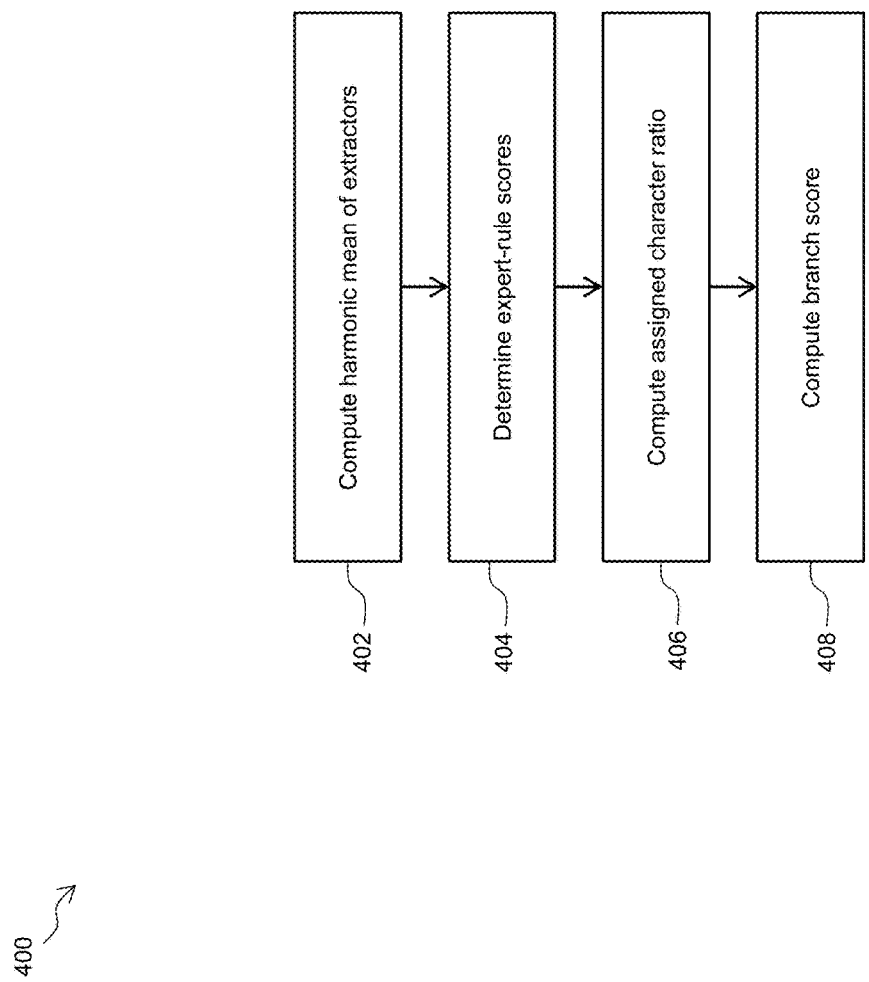
FIG. 4 is a flow diagram showing an example process for computing a branch score according to some embodiments of the present disclosure.

FIG. 4 is a flow diagram showing an example process 400 for computing a branch score according to some embodiments of the present disclosure. Process 400 can be performed by the branch evaluation module 112 at block 208 of process 200 and or blocks 310 and 312 of process 300. Specifically, the steps of process 400 are performed on a search tree that enumerates the possible combinations of entity candidates from the various extractors in the entity, where each branch is a combination of detected entities. At block 402, the branch evaluation module 112 computes a harmonic mean of the extractors for a branch. In particular, as discussed above, each branch includes a potential structuring of the transaction description, where each node on the branch is an entity candidate. The branch is a potential set of entities that structures the transaction description. Therefore, the harmonic mean is calculated based on the confidence level of each extracted entity in the branch. In some embodiments, other types of averages may be used, such as an arithmetic mean. Referring back to the example described with respect to FIG. 2, where a branch has payment method=CHECKCARD; merchant=ROSAS CAFÉ & TORTILLA; state=TX, serial number=240999999999; last four digits=CHECKCARD 0999; street=F; and city=LUBBOCK, the branch evaluation module 112 computes the harmonic mean of the extractor that identified each of the entities above.

At block 404, the branch evaluation module 112 determines the expert-rule score for the branch. In some embodiments, the expert-rules score can include a harmonic mean (or other type of mean) of the confidence level from the rules that are true and the complement (i.e., (1-P)) of the confidence level for rules that are false. At block 406, the branch evaluation module 112 computes an assigned character ratio for the branch. An assigned character ratio is the percentage of characters in the original transaction description that are included in an entity of the branch. For example, 95% of characters in the original description may be included in an entity. In other words, the assigned character ratio helps determine how much information from the original description is lost in the structured version. At block 408, the branch evaluation module 112 computes a branch score for the branch. The branch score can be based on the harmonic mean, the expert-rules score, and the assigned character ratio. The branch score can be computed in various ways, such as averaging the three scores, using the maximum or minimum of the three scores, and more advanced combination methods that apply weights to each of the three scores. In some embodiments, other complex scoring mechanisms can be used, such as if two scores are greater than a pre-defined threshold (e.g., 0.85), then the final score is a pre-defined value (e.g., 0.90).

In addition, one or more embodiments offer numerous technical and computational benefits. First, a search tree, such as depth-first search (DFS) or breadth-first search (BFS), may be used to identify a preferred branch within the three, a single branch can be maintained within memory at a time, rather than an entire tree. Second, since an exhaustive search over all valid combinations of entities can be computationally expensive, the disclosed principles can utilize a mechanism that stops the search if it takes too long, such as by restarting the search but with fewer predictions by demanding a higher confidence level from the extractors for the revised search. Third, a Dynamic Programming/hashing approach can save redundant computations.

Figure 5:
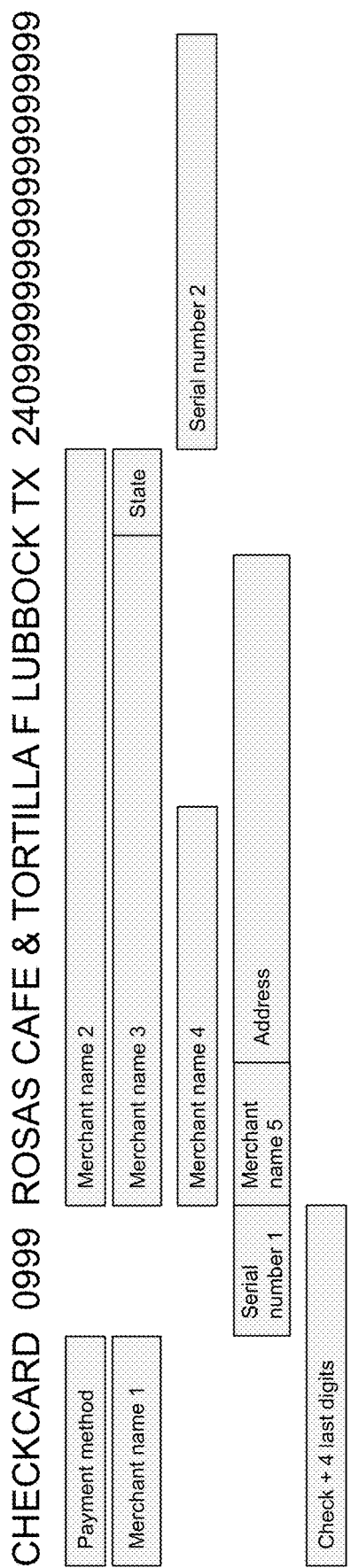
FIG. 5 is an example illustration of candidate entity strings for a description according to some embodiments of the present disclosure.

FIG. 5 is an example illustration of candidate entity strings for a description according to some embodiments of the present disclosure. The example description is "CHECKCARD 0999 ROSAS CAFÉ & TORTILLA F LUBBOCK TX 240999999999999999999". The candidate strings are illustrated in sequential order. "CHECKCARD" is predicted to be a payment method entity or a merchant name entity (merchant name 1). "CHECKCARD 0999" is predicted to be a last four digits entity. "0999" is predicted to be a serial number (serial number 1). "ROSAS CAFÉ & TORTILLA F LUBBOCK TX" (merchant name 2), "ROSAS CAFÉ & TORTILLA F LUBBOCK" (merchant name 3), "ROSAS CAFÉ & TORTILLA" (merchant name 4), and "ROSAS" (merchant name 5) are predicted to be merchant entities. "TX" is predicted to be a state, "CAFÉ & TORTILLA F LUBBOCK" is predicted to be an address, and "240999999999999999999" is predicted to be a serial number (serial number 2).

Figure 6:
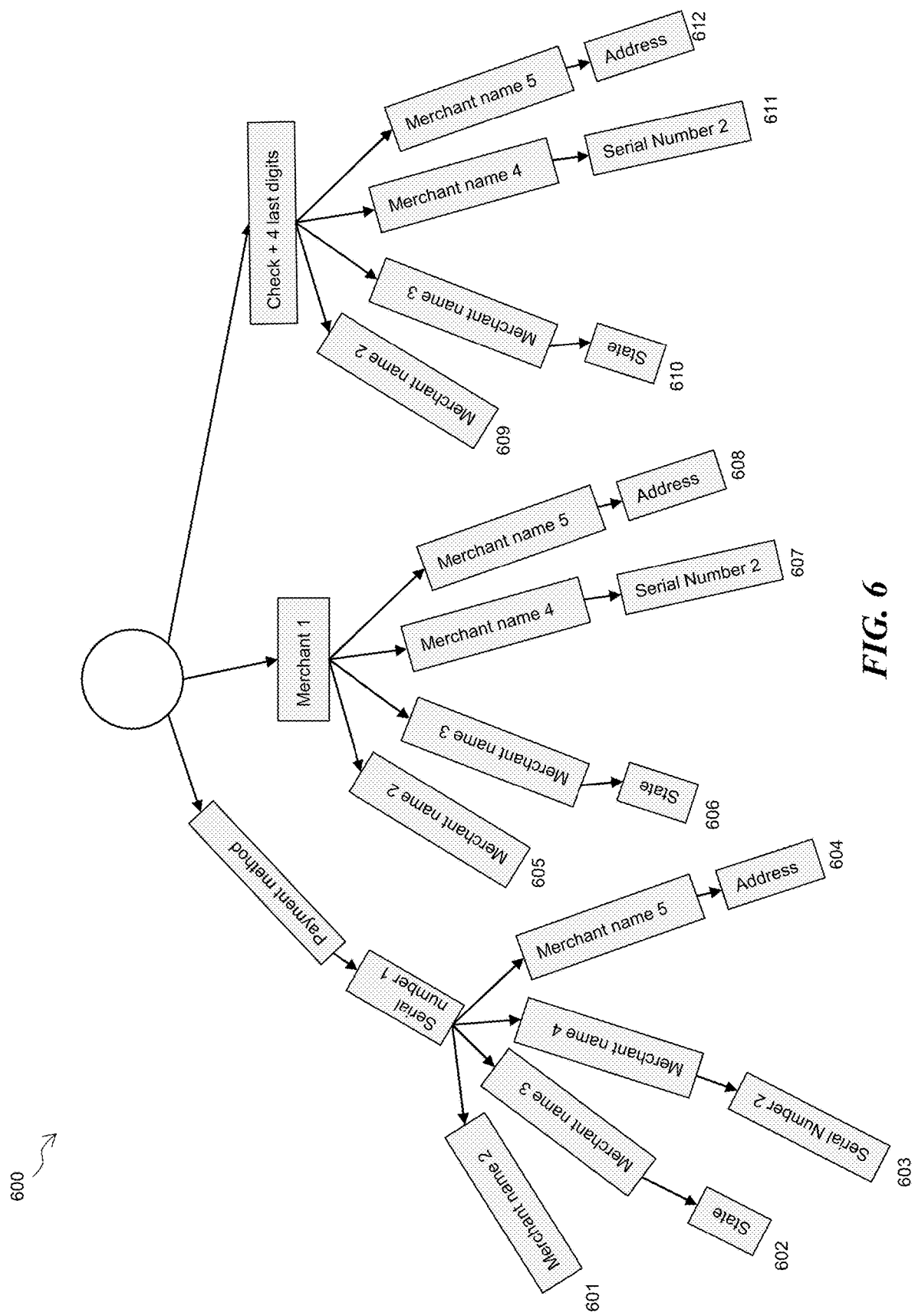
FIG. 6 is an example search tree based on the candidate entity strings from FIG. 5 according to some embodiments of the present disclosure.

FIG. 6 is an example search tree 600 based on the candidate entity strings from FIG. 5 according to some embodiments of the present disclosure. The search tree 600 includes branches 601-612 that enumerate the possible combinations of the candidate entity strings from FIG. 5. Each branch would then be scored to evaluate which branch is the best choice for structuring the original description.

Figure 7:
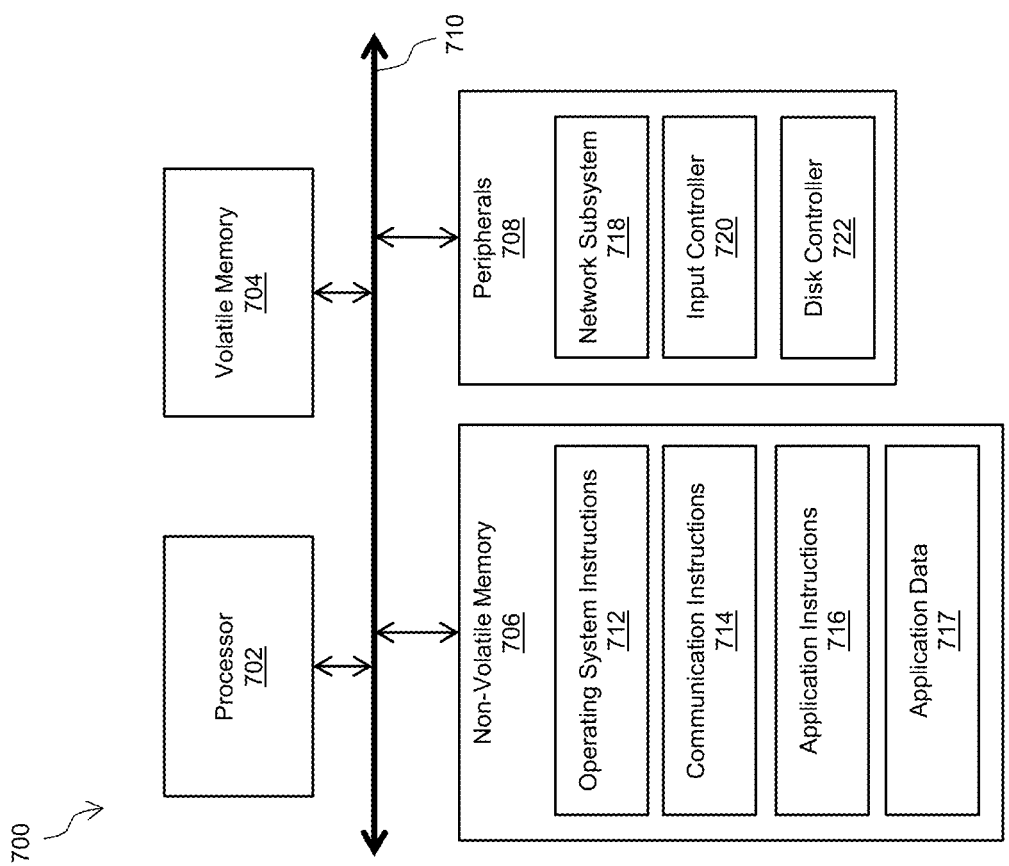
FIG. 7 is an example server device that can be used within the system of FIG. 1 according to an embodiment of the present disclosure.

FIG. 7 is a diagram of an example server device 700 that can be used within system 100 of FIG. 1. Server device 700 can implement various features and processes as described herein. Server device 700 can be implemented on any electronic device that runs software applications derived from complied instructions, including without limitation personal computers, servers, smart phones, media players, electronic tablets, game consoles, email devices, etc. In some implementations, server device 700 can include one or more processors 702, volatile memory 704, non-volatile memory 706, and one or more peripherals 708. These components can be interconnected by one or more computer buses 710.

Processor(s) 702 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 710 can be any known internal or external bus technology, including but not limited to ISA, EISA, PCI, PCI Express, USB, Serial ATA, or FireWire. Volatile memory 704 can include, for example, SDRAM. Processor 702 can receive instructions and data from a read-only memory or a random access memory or both. Essential elements of a computer can include a processor for executing instructions and one or more memories for storing instructions and data.

Non-volatile memory 706 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 706 can store various computer instructions including operating system instructions 712, communication instructions 714, application instructions 716, and application data 717. Operating system instructions 712 can include instructions for implementing an operating system (e.g., Mac OS®, Windows®, or Linux). The operating system can be multi-user, multiprocessing, multitasking, multithreading, real-time, and the like. Communication instructions 714 can include network communications instructions, for example, software for implementing communication protocols, such as TCP/IP, HTTP, Ethernet, telephony, etc. Application instructions 716 can include instructions for various applications. Application data 717 can include data corresponding to the applications.

Peripherals 708 can be included within server device 700 or operatively coupled to communicate with server device 700. Peripherals 708 can include, for example, network subsystem 718, input controller 720, and disk controller 722. Network subsystem 718 can include, for example, an Ethernet of WiFi adapter. Input controller 720 can be any known input device technology, including but not limited to a keyboard (including a virtual keyboard), mouse, track ball, and touch-sensitive pad or display. Disk controller 722 can include one or more mass storage devices for storing data files; such devices include magnetic disks, such as internal hard disks and removable disks; magneto-optical disks; and optical disks.

Figure 8:
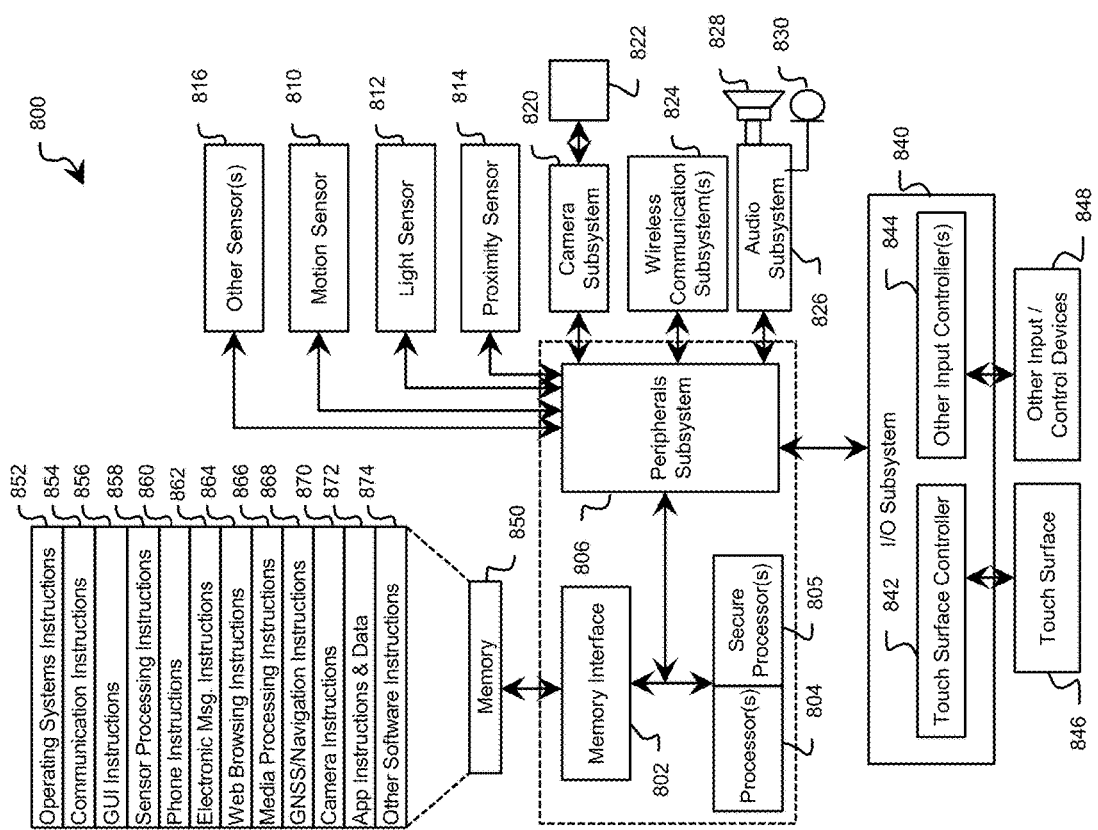
FIG. 8 is an example computing device that can be used within the system of FIG. 1 according to an embodiment of the present disclosure.

FIG. 8 is an example computing device that can be used within the system 100 of FIG. 1, according to an embodiment of the present disclosure. In some embodiments, device 800 can be user device 102. The illustrative user device 800 can include a memory interface 802, one or more data processors, image processors, central processing units 804, and/or secure processing units 805, and peripherals subsystem 806. Memory interface 802, one or more central processing units 804 and/or secure processing units 805, and/or peripherals subsystem 806 can be separate components or can be integrated in one or more integrated circuits. The various components in user device 800 can be coupled by one or more communication buses or signal lines.

Sensors, devices, and subsystems can be coupled to peripherals subsystem 806 to facilitate multiple functionalities. For example, motion sensor 810, light sensor 812, and proximity sensor 814 can be coupled to peripherals subsystem 806 to facilitate orientation, lighting, and proximity functions. Other sensors 816 can also be connected to peripherals subsystem 806, such as a global navigation satellite system (GNSS) (e.g., GPS receiver), a temperature sensor, a biometric sensor, magnetometer, or other sensing device, to facilitate related functionalities.

Camera subsystem 820 and optical sensor 822, e.g., a charged coupled device (CCD) or a complementary metal-oxide semiconductor (CMOS) optical sensor, can be utilized to facilitate camera functions, such as recording photographs and video clips. Camera subsystem 820 and optical sensor 822 can be used to collect images of a user to be used during authentication of a user, e.g., by performing facial recognition analysis.

Communication functions can be facilitated through one or more wired and/or wireless communication subsystems 824, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 824. The specific design and implementation of communication subsystems 824 can depend on the communication network(s) over which the user device 800 is intended to operate. For example, user device 800 can include communication subsystems 824 designed to operate over a GSM network, a GPRS network, an EDGE network, a WiFi or WiMax network, and a Bluetooth™ network. For example, wireless communication subsystems 824 can include hosting protocols such that device 800 can be configured as a base station for other wireless devices and/or to provide a WiFi service.

Audio subsystem 826 can be coupled to speaker 828 and microphone 830 to facilitate voice-enabled functions, such as speaker recognition, voice replication, digital recording, and telephony functions. Audio subsystem 826 can be configured to facilitate processing voice commands, voiceprinting, and voice authentication, for example.

I/O subsystem 840 can include a touch-surface controller 842 and/or other input controller(s) 844. Touch-surface controller 842 can be coupled to a touch-surface 846. Touch-surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In some implementations, a pressing of the button for a first duration can disengage a lock of touch-surface 846; and a pressing of the button for a second duration that is longer than the first duration can turn power to user device 800 on or off. Pressing the button for a third duration can activate a voice control, or voice command, module that enables the user to speak commands into microphone 830 to cause the device to execute the spoken command. The user can customize a functionality of one or more of the buttons. Touch-surface 846 can, for example, also be used to implement virtual or soft buttons and/or a keyboard.

In some implementations, user device 800 can present recorded audio and/or video files, such as MP3, AAC, and MPEG files. In some implementations, user device 800 can include the functionality of an MP3 player, such as an iPod™. User device 800 can, therefore, include a 36-pin connector and/or 8-pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store an operating system 852, such as Darwin, RTXC, LINUX, UNIX, OS X, Windows, or an embedded operating system such as VxWorks.

Operating system 852 can include instructions for handling basic system services and for performing hardware dependent tasks. In some implementations, operating system 852 can be a kernel (e.g., UNIX kernel). In some implementations, operating system 852 can include instructions for performing voice authentication.

Memory 850 can also store communication instructions 854 to facilitate communicating with one or more additional devices, one or more computers and/or one or more servers. Memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic messaging-related process and functions; web browsing instructions 864 to facilitate web browsing-related processes and functions; media processing instructions 866 to facilitate media processing-related functions and processes; GNSS/Navigation instructions 868 to facilitate GNSS and navigation-related processes and instructions; and/or camera instructions 870 to facilitate camera-related processes and functions.

Memory 850 can store application (or "app") instructions and data 872, such as instructions for the apps described above in the context of FIGS. 1-4. Memory 850 can also store other software instructions 874 for various other software applications in place on device 800.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for structuring textual data performed by at least one processor, said method comprising:
receiving a description associated with an event;
extracting one or more candidate strings from the description for a respective entity type, wherein the extracting is performed by one or more extractors and each branch score is based on confidence levels of the extractors in the respective branch and an assigned character ratio of the branch, wherein computing a branch score comprises:
computing a harmonic mean of the confidence levels of the extractors in the respective branch;
computing the assigned character ratio of the respective branch; and
combining the harmonic mean and the assigned character ratio to compute the branch score;
outputting a confidence level for each candidate string;
generating a search tree with the one or more candidate strings, the search tree comprising a plurality of branches;
computing a branch score for each of the plurality of branches;
identifying a branch with a highest branch score; and
structuring the description based on the identified branch.

2. The computer-implemented method of claim 1, wherein an output for each candidate string comprises information that specifies a starting position, a length, a domain, and the respective confidence level.

3. The computer-implemented method of claim 1, further comprising:
extracting at least one of the one or more candidate strings from the description with a Regular Expression (RegEx) extractor; and
outputting a confidence level from the RegEx extractor.

4. The computer-implemented method of claim 1, further comprising:
extracting at least one of the one or more candidate strings with a machine learning-based extractor trained to identify an entity; and
outputting a confidence level from the machine learning-based extractor.

5. The computer-implemented method of claim 1, wherein generating the search tree comprises generating a recursive search tree that enumerates possible combinations of the one or more candidate strings, each branch representing a combination.

6. The computer-implemented method of claim 1, wherein generating the search tree comprises:
defining first-level nodes of the search tree as first candidate strings from the description; and
defining, for each level after the first-level nodes, candidate strings that continue along the description.

7. The computer-implemented method of claim 1 comprising:
extracting at least one of the one or more candidate strings from the description with an expert-defined extraction rule; and
outputting a confidence level from the expert-defined extraction rule;
wherein computing a branch score comprises:
computing a harmonic mean of the confidence levels of the extractors;
computing a harmonic mean of the confidence level of the expert-defined extraction rule;
computing the assigned character ratio of the respective branch; and
combining the harmonic means and the assigned character ratio to compute the branch score.

8. The computer-implemented method of claim 1 comprising:
determining that the branch score computations require longer than a predefined time period;
removing one or more branches from the search tree with entity instances that have a confidence level below a predefined confidence level threshold; and
restarting the branch score computations.

9. A system for structuring textual data comprising:
a computing device configured to:
receive a description associated with an event;
extract one or more candidate strings from the description for a respective entity type, wherein the extracting is performed by one or more extractors and each branch score is based on confidence levels of the extractors in the respective branch and an assigned character ratio of the branch, wherein computing a branch score comprises:
computing a harmonic mean of the confidence levels of the extractors in the respective branch;
computing the assigned character ratio of the respective branch; and
combining the harmonic mean and the assigned character
ratio to compute the branch score;
output a confidence level for each candidate string;
generate a search tree with the one or more candidate strings, the search tree comprising a plurality of branches;

compute a branch score for each of the plurality of branches;
identify a branch with a highest branch score; and
structure the description based on the identified branch.

10. The system of claim 9, wherein an output for each candidate string comprises information that specifies a starting position, a length, a domain, and the respective confidence level.

11. The system of claim 9, wherein the computing device is further configured to:
extract at least one of the one or more candidate strings from the description with a Regular Expression (RegEx) extractor; and
output a confidence level from the RegEx extractor.

12. The system of claim 9, wherein the computing device is further configured to:
extract at least one of the one or more candidate strings with a machine learning-based extractor trained to identify an entity; and
output a confidence level from the machine learning-based extractor.

13. The system of claim 9, wherein generating the search tree comprises generating a recursive search tree that enumerates possible combinations of the one or more candidate strings, each branch representing a combination.

14. The system of claim 9, wherein generating the search tree comprises:
defining first-level nodes of the search tree as first candidate strings from the description; and
defining, for each level after the first-level nodes, candidate strings that continue along the description.

15. The system of claim 9, wherein the computing device is further configured to:
extract at least one of the one or more candidate strings from the description with an expert-defined extraction rule; and
output a confidence level from the expert-defined extraction rule;
wherein computing a branch score comprises:
computing a harmonic mean of the confidence levels of the extractors;
computing a harmonic mean of the confidence level of the expert-defined extraction rule;
computing the assigned character ratio of the respective branch; and
combining the harmonic means and the assigned character ratio to compute the branch score.

16. The system of claim 9, wherein the computing device is further configured to:
determine that the branch score computations require longer than a predefined time period;
remove one or more branches from the search tree with entity instances that have a confidence level below a predefined confidence level threshold; and
restart the branch score computations.

* * * * *